June 20, 1967  R. J. RENN  3,326,502
MOUNTING FOR POST DRIVER

Filed Nov. 9, 1964  2 Sheets-Sheet 1

Reynold J. Renn
INVENTOR

BY- Edward Emily Bixby
ATTORNEY

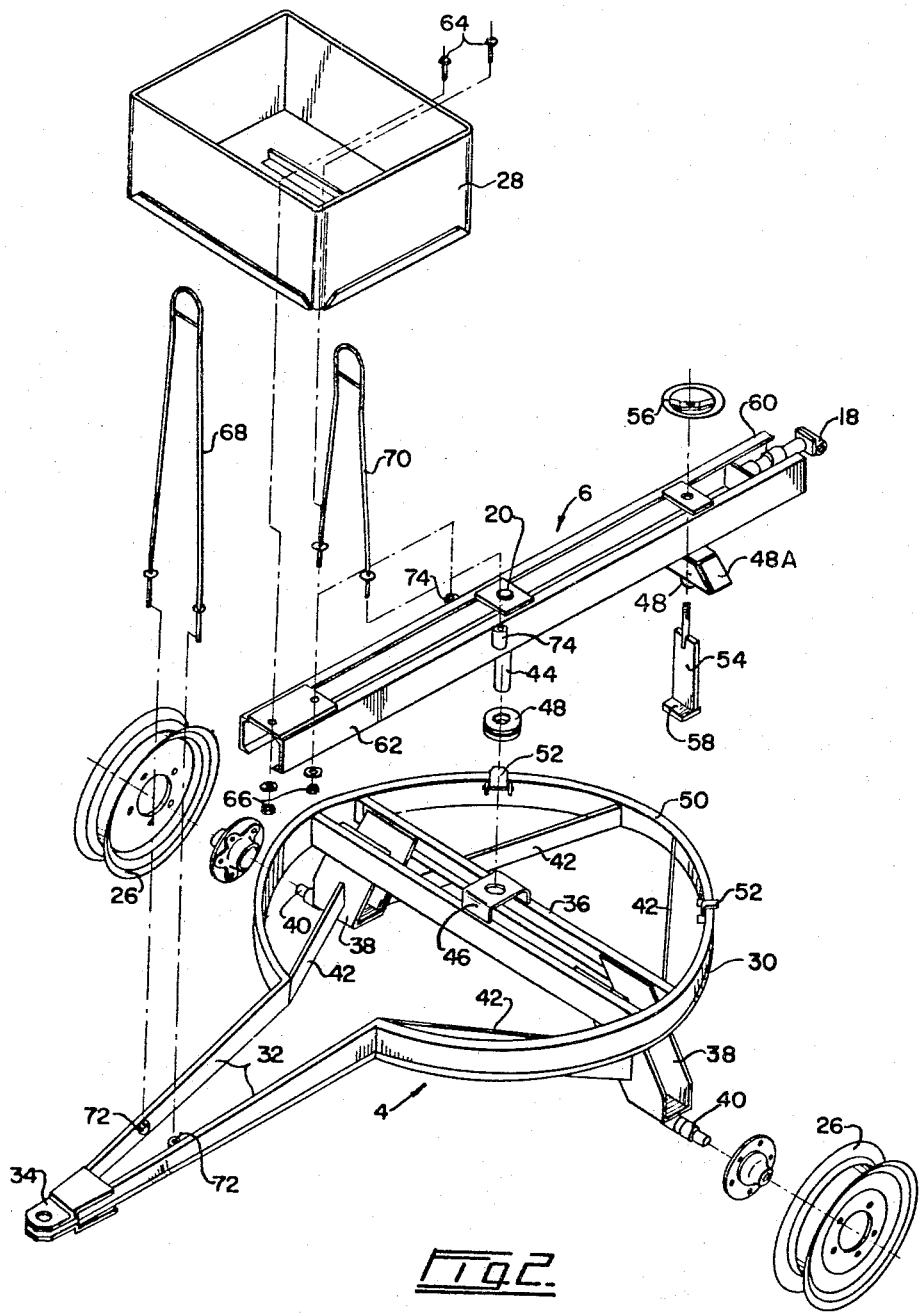

United States Patent Office 3,326,502
Patented June 20, 1967

3,326,502
MOUNTING FOR POST DRIVER
Reynold J. Renn, 443 Riverdale Ave., Calgary,
Alberta, Canada
Filed Nov. 9, 1964, Ser. No. 409,808
2 Claims. (Cl. 248—13)

This invention relates generally to supporting mechanisms and particularly to a mounting for a post driver.

Post drivers of the type comprising a channel into which a post may be fitted and having a weighted hammer that may be raised and lowered to pound on the top of the post are well known.

It is customary to mount such post drivers at the front, back or side of a tractor or trailer with some means for adjusting the verticality of the post driver with respect to its support.

While such mountings operate satisfactorily to support the post driver and allow its operation, difficulty usually is found in adjusting the post driver to the precise position for pounding a post and, as a result, the operator of the equipment must resort to considerable manoeuvering of the tractor or trailer to place the post driver in the proper position.

My invention is designed to overcome the above difficulties and to provide a post driver that may be adjusted to a number of positions with relation to the equipment on which it is mounted.

The essence of my invention is to mount a post driver on a swingable arm which rides on a supporting track so that the post driver may be swung to a variety of positions within the limits of the track on which it is supported.

With the reference now to the drawings illustrating preferred embodiments:

FIGURE 2 is a perspective exploded view of the supporting trailer and post driver mounting mechanism.

Figure 1:
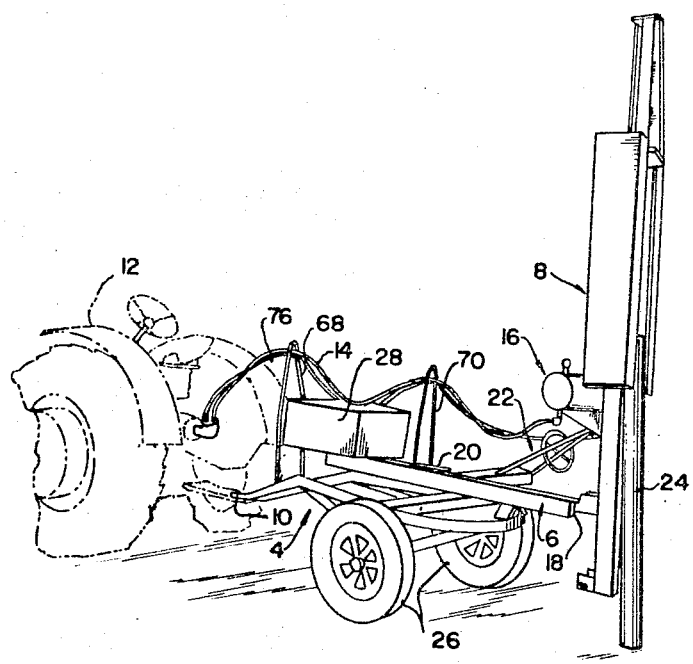
FIGURE 1 is a perspective view illustrating the post driver mounted on a supporting trailer which is connected to a tractor and in position for pounding a post.

With reference to FIGURE 1 in the drawings, the supporting trailer is designated generally at 4 with the post driver mounting arm indicated generally at 6 and the post driver indicated generally at 8. The trailer 4 is connected at 10 to a hauling tractor 12 which supplies hydraulic fluid through the lines 14 to the hydraulic raising and lowering mechanism indicated generally at 16. The post driver is connected at 18 to the end of the mounting arm 6 which is pivotally attached to the trailer at 20.

As is common, manual adjusting means indicated generally at 22 is provided to react between the post driver 8 and the trailer 4 and adjust the verticality of the post driver so that it will be in the position to properly drive the post 24 into the ground.

The trailer 4 is provided with suitable running gear including the wheels 26 and with a weight receptacle 28 mounted on the opposite end of the arm 6 to the connection 18 to receive suitable weight as for example stones or the like and counterweight the post driver 8.

The mounting trailer and post driver supporting arm will be described more particularly with reference to FIGURE 2 of the drawings.

The curved track 4 consists of the curved track which, in the embodiment illustrated in FIGURE 2 is curved through approximately 300 degrees. I have found that the track may be curved throughout an arc of from 180 to almost 360 degrees depending on the preference of the ultimate user of the device.

The curved track 30 is formed into arms 32 projecting therefrom and terminating in an attachment 34 for connection to a tractor or the like.

It should be understood that the track 30 could be formed with a variety of connecting arms 32 for attachment of the track 30 to the rear, front or side of a tractor as is desired, the principle requirement being that the track 30 is supported in a substantially horizontal position.

A cross piece 36 extends diametrically across the track 30 and legs 38 depend down from the cross piece with axles 40 for attachment of the wheels 26. Suitable diagonal bracing 42 extending from the legs 38 is provided for necessary rigidity.

The post driver mounting arm 6 is connected pivotally at 20 through the pin 44 to the mounting 46 on the cross piece 36 and anti-friction bearing 48 is positioned between the arm 6 and the mounting 46.

Anti-friction means in the form of rollers 48 mounted rotatably within the block 48A are secured to the underside of the arm 6 to ride on the upper edge 50 of the track 30 and enable swinging movement of the arm 6 with a minimum of friction.

If it is desired to restrict swinging movement of the arm 6 on the track 30 manually adjusted flip up stops 52 may be employed. When complete swinging movement of the arm is desired, the stops 52 are merely moved out of the way.

The arm 6 is locked with relation to the track 30 by a simple hook 54 which projects through the arm 6 and is adjusted by the hand wheel 56 to move the hook up and down and engage or disengage the horizontal step 58 with the underside of the track.

The post driver connection 18 at the one end 60 of the arm 6 is a simple bolt and socket construction although any convenient means could be provided for connection of the post driver.

The weight box 28 at the opposite end 62 of the arm is attached through simple bolt and nut means 64 and 66, the box 28 being of sufficient size and construction to support the necessary weight to counterweight the post driver. Hair pin supports 68 and 70 adapted to fit in the sockets 72 on the arms 32, and 74 on the arm 6, are provided to support hydraulic hoses 76 leading from the tractor 12.

In operation, the device would be assembled substantially as illustrated and with the arm 6 pivotally mounted in the mount 46 a suitable post driver would be connected at 18. Thereafter suitable counterweights would be deposited in the weight box 28 it being only necessary to provide sufficient counterweight that the arm with the post driver attached may be moved easily on the track 30. Thereafter the track 30 whether mounted on a trailer or secured rigidly to a tractor or the like would be moved as closely as possible to the post to be driven, the arm would be swung to place the post driver directly over the post and then locked in position. Thereafter the operator could manipulate the post driver in the customary fashion to drive the post into the ground.

What I claim as my invention is:

1. A mounting for a tractor driven post driver comprising a circular track open at the front end, wheel means supporting the said track in a horizontal position adapted to be drawn by the tractor, an arm pivoted within the arc of the said track and riding thereon, said arm projecting rearwardly from the said track, adjustable counterbalance means secured to the said arm forwardly from the pivot, and post driver attachment means secured to the portion of the said arm which extends rearwardly from the pivot and projects beyond the said track.

2. A post driver unit adapted for use with a tractor comprising a circular track open at the front end, a trailer supporting the said track in a horizontal position and adapted to be drawn by the tractor, an arm pivoted within the arc of the said track and riding thereon, said arm projecting rearwardly from the said track, adjustable counterbalance means secured to the said arm forwardly from the pivot, post driver attachment means secured to the portion of the said arm which extends rearwardly from the pivot and projects beyond the said track and post driver means carried by the said attachment means and adapted to be actuated by the tractor.

References Cited

UNITED STATES PATENTS

| | | | |
|---|---|---|---|
| 2,532,079 | 11/1950 | Beltz | 248—13 X |
| 2,703,255 | 3/1955 | Penwell | 248—289 X |
| 2,808,223 | 10/1957 | Abeles et al. | 248—349 |
| 2,889,685 | 6/1959 | Pickman | 280—28.5 |

ROY D. FRAZIER, *Primary Examiner.*

JOHN PETO, *Examiner.*